US010046704B2

(12) United States Patent
Vicioso et al.

(10) Patent No.: US 10,046,704 B2
(45) Date of Patent: Aug. 14, 2018

(54) FOLD REARVIEW MIRROR ASSEMBLY FOR MOTOR VEHICLES

(71) Applicant: FICO MIRRORS, S.A., Barcelona (ES)

(72) Inventors: José Mendoza Vicioso, Barcelona (ES); Juan Linares Casals, Barcelona (ES)

(73) Assignee: FICO MIRRORS, S.A.U., Barcelona (ES)

( * ) Notice: Subject to any disclaimer, the term of this patent is extended or adjusted under 35 U.S.C. 154(b) by 0 days.

(21) Appl. No.: 15/311,377

(22) PCT Filed: May 6, 2015

(86) PCT No.: PCT/EP2015/059966
§ 371 (c)(1),
(2) Date: Nov. 15, 2016

(87) PCT Pub. No.: WO2015/173090
PCT Pub. Date: Nov. 19, 2015

(65) Prior Publication Data
US 2017/0203695 A1    Jul. 20, 2017

(30) Foreign Application Priority Data

May 14, 2014    (EP) .................................... 14168362

(51) Int. Cl.
*B60R 1/074*    (2006.01)
*B60R 1/064*    (2006.01)
(52) U.S. Cl.
CPC .............. *B60R 1/074* (2013.01); *B60R 1/064* (2013.01)

(58) Field of Classification Search
None
See application file for complete search history.

(56) References Cited

U.S. PATENT DOCUMENTS 8,366,284 B2     2/2013   Flynn et al.
2003/0218812 A1* 11/2003  Foote ...................... B60R 1/074
                                                    359/874
(Continued)

FOREIGN PATENT DOCUMENTS

DE    9321326 U1    5/1997
EP    2439106 A1    4/2012

OTHER PUBLICATIONS

International Search Report for PCT Application No. PCT/EP2015/059966 dated Jun. 19, 2015.
(Continued)

*Primary Examiner* — Jennifer D. Carruth
(74) *Attorney, Agent, or Firm* — Cantor Colburn LLP

(57) ABSTRACT

A fold rearview mirror assembly for a motor vehicle comprises a base member, a mirror head, and a motor component for rotating, through a drive means comprising a gear wheel assembly, the mirror housing relative to the base member between a mirror operative condition and a mirror folded condition, and vice versa. The gear wheel assembly comprises a first and second gear wheels coupled to each other through first coupling means. The first gear wheel engages a motor component through a second coupling means and the second gear wheel in turn engages the base member through a third coupling means. The first coupling means allow the first and second gear wheels to be rotated together in one direction, and allow the first gear wheel to be rotated relative to the second gear wheel in the reverse direction.

20 Claims, 3 Drawing Sheets

(56) References Cited

U.S. PATENT DOCUMENTS

2012/0087026 A1\* 4/2012 Schuurmans ........... B60R 1/074
                                                                                        359/841
2017/0203695 A1\* 7/2017 Vicioso .................. B60R 1/074

OTHER PUBLICATIONS

Written Opinion for PCT Application No. PCT/EP2015/059966 dated Jun. 19, 2015.

\* cited by examiner

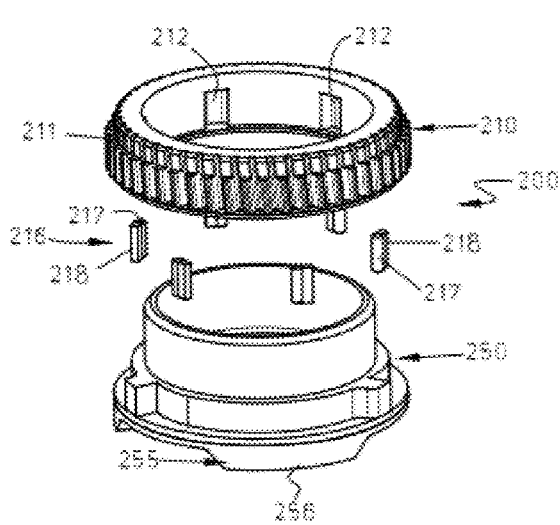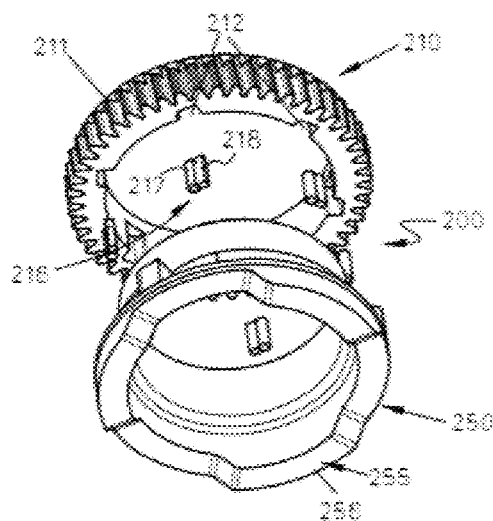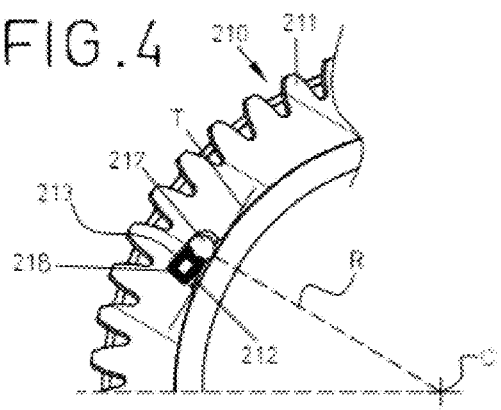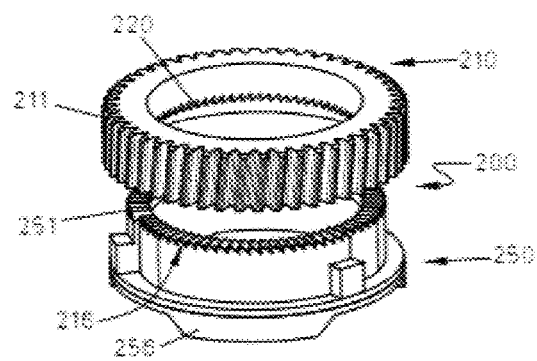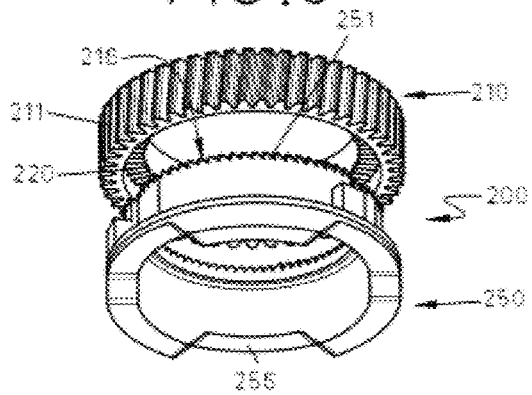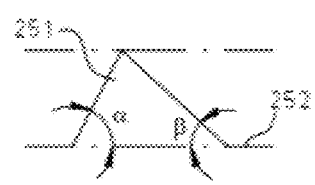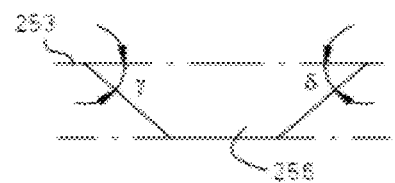

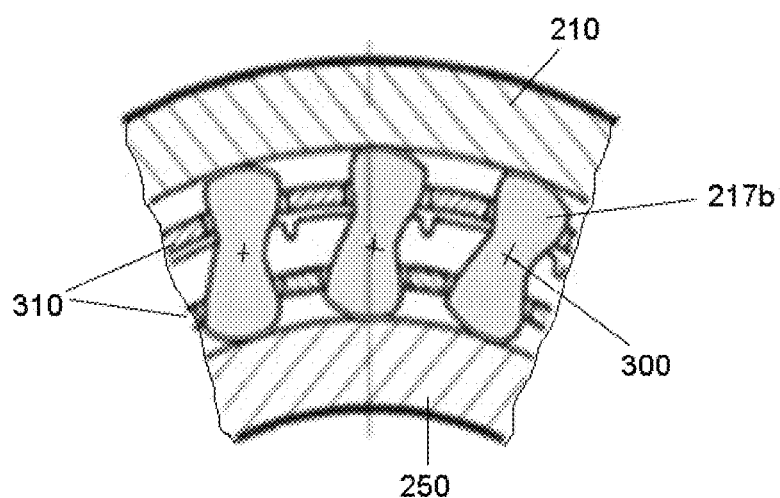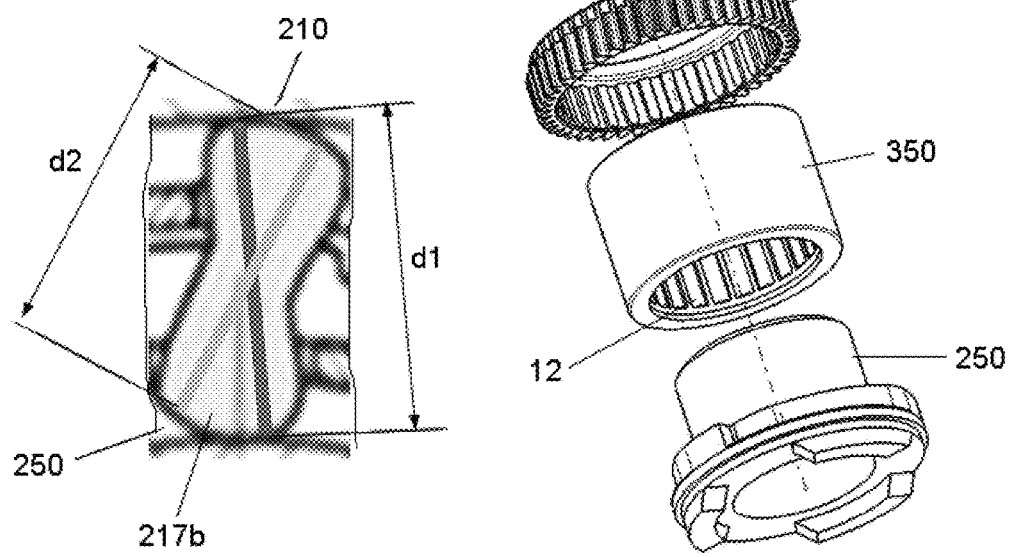

FOLD REARVIEW MIRROR ASSEMBLY FOR MOTOR VEHICLES

CROSS-REFERENCES TO RELATED APPLICATIONS

This patent application is a National Phase Application of Patent Application PCT/EP2015/059966 filed May 6, 2015, which claims priority to European Patent Application No. EP14168362.3 filed May 14, 2014, both of which are incorporated herein by reference in their entirety.

BACKGROUND OF THE INVENTION

The present disclosure relates to rearview mirrors for motor vehicles and more specifically to an external fold rearview mirror assembly for motor vehicles.

The external fold rearview mirror assembly comprises a mirror head that can be rotated by means of a motor component between a mirror operative condition (driving position) and a mirror folded condition (parking position), and vice versa. The present mirror assembly can be also rotated manually from the mirror operative condition to the mirror folded condition if necessary.

Many current motor vehicles are currently fitted with mirror assemblies comprising a mirror head that can be driven in rotation by means of a motor component. The mirror head can be rotated by the motor component about a substantially vertical pivot axis for being arranged in a mirror operative condition (driving position) or in a mirror folded condition (parking position).

Locking means are provided for holding the mirror head in said driving and parking positions. The locking means may be for example a detent mechanism comprising detent elements formed in the mirror head and in a base member, respectively. The base member is adapted to be attached to the motor vehicle and, in use, the mirror head can be rotated by the motor component relative to the base member.

Although mirror assemblies actuated by a motor component may be efficient and comfortable for the user, in case of failure of the motor component it may be difficult to manually release the mirror head from the above mentioned locking means in order to rotate it into a different mirror position.

In an attempt to mitigate such disadvantage in prior art mirror assemblies actuated by means of a motor component, drive means are provided including clutch means. The clutch means are capable of disconnecting the motor component from the mirror head in some specific cases so that the mirror head can be rotated manually by the user.

Document EP2439106 discloses a rear view mirror assembly provided with drive means including a clutch member. The clutch member is axially movable from an engaged position restraining relative rotation to a mirror base and a disengaged position where only a frictional engagement restrains relative rotation between the clutch member and the mirror base by a non-back drivable electric drive train.

In U.S. Pat. No. 8,366,284 a rearview mirror assembly is disclosed comprising drive means provided with a clutch mechanism that connects a drive train to a base when the drive train is driving and disconnects the drive train from the base when the drive train is not driving.

However, when the mirror head has to be rotated manually by the user to the mirror operative condition (driving position) the gear wheel assembly in the prior art known solutions is not capable of allowing the user to arrange the mirror head in a final operative condition suitable for driving. This is because the detent mechanism does not provide accurate preset angular positions for the mirror head when being opened manually into the mirror operative condition (driving position). In such case, if the mirror head is forced to be arranged in an intermediate, accurate angular position suitable for driving, the mirror head becomes arranged in an unstable condition on the base member.

Such unstable angular position of the mirror head occurs since the intermediate angular position of the mirror head usually involves that the detent elements of the mirror head are arranged onto those of the base member. In this condition, all teeth are allowed to slide to each other while the vehicle is running, that is, no meshing occurs. Consequently, the mirror head is likely to be rotated back to a more stable angular position of the mirror head but probably not being the most appropriate for driving.

SUMMARY OF THE INVENTION

In a first aspect, a fold rearview mirror assembly is provided. The fold rearview mirror assembly disclosed herein comprises a base member. The base member comprises a structure adapted to be fixedly mounted on a motor vehicle. A mirror head is also provided for receiving a mirror element.

A motor component is further provided. The motor component may comprise a motor, such as for example an electric motor. The motor can be suitably received into a motor housing. The motor housing is attached to or is part of the mirror housing. The motor is suitable for rotating the mirror head between a mirror operative condition and a mirror folded condition, and vice versa. In this movement of rotation, the mirror housing, and therefore the motor housing, is rotated relative to the base member while the output shaft of the motor is rotating. The motor housing and the mirror housing may define a mirror head so that the mirror head is rotated by the motor in use.

A gear wheel assembly is provided for transmitting the movement from the motor component for rotating the mirror head relative to the base member between a mirror operative condition and a mirror folded condition, and vice versa.

The gear wheel assembly comprises a first gear wheel and a second gear wheel. The second gear wheel may be at least partially fitted within the first gear wheel.

Both gear wheels are coupled to each other through first coupling means. The first gear wheel, in turn, engages the motor component through second coupling means. The second gear wheel, in turn, engages the base member through third coupling means. The third coupling means may be, for example, a detent mechanism as stated above.

The first coupling means are adapted for allowing the first and second gear wheels of the wheel assembly to be rotated together in a first direction of rotation, and for allowing the first gear wheel to be rotated relative to the second gear wheel in a second, reverse direction of rotation. As used herein, direction of rotation refers to that of the mirror head relative to the base member.

Thus, the first coupling means act as a clutch mechanism allowing the gear wheel assembly to be rotated as a whole only in one single direction of rotation, usually by the motor component. In this case, the gear wheel assembly is actuated by the motor component to arrange the mirror head to be rotated into a mirror folded condition (parking position).

In the second, reverse direction of rotation, the clutch mechanism acts resulting in that the first gear wheel is allowed to be rotated relative to the second gear wheel as the mirror head is actuated manually by the user for arranging it in the mirror operative condition (driving position), for example in case of failure of the motor component.

One advantage of the above described rearview mirror assembly with a gear wheel assembly comprising first and second gear wheels coupled to each other by means of a first coupling means or clutch mechanism is that, in case of failure of the motor component, the mirror head can be rotated manually by the user to an accurate position as desired which is suitable for driving.

One further advantage of the above described rearview mirror assembly is that, in case the user manually rotates the mirror head to a position other than the driving position, the first coupling means prevent the mirror head from rotating back into the mirror folded condition, thus assuring that the user may safely drive the motor vehicle even if the mirror head has not been correctly positioned.

In addition, the above described rearview mirror assembly has a further advantage relating to noise isolation. In order to ensure proper noise isolation, prior art rearview mirror assemblies are usually provided with at least one sealing gasket. The sealing gasket is fitted between the base member and the mirror head. Such sealing gasket is adapted for closing a gap between the base member and the mirror head, in turn avoiding or at least reducing noise in a moving vehicle which is mainly caused by wind.

Hence, when the mirror head is rotated manually by the user to an angular position suitable for driving, the gap between the base member and the mirror head remains substantially unaltered throughout the unfolding movement resulting in that the sealing gasket does not become decompressed. In other words, the gap between the base member and the mirror head is substantially constant throughout the manual rotation movement from the mirror folded condition (parking position) towards the mirror operative condition (driving position).

As a consequence, in case the user manually rotates the mirror head to a position other than the driving position, the noise isolation effect is not lost.

In a first example of the present mirror assembly, the first coupling means or clutch mechanism may comprise at least one interlocking member. The specific number of interlocking members may vary upon requirements. While at least one interlocking member is sufficient, at least three would be preferable to avoid clearances between the first and second gear wheels.

The interlocking members may be adapted to move between an interlocking position and a non-interlocking position when driven by the contact of the interlocking members with one of the first gear wheel and the second gear wheel against biasing means. This causes the first and second gear wheels to be rotated together in one direction and allowing the first and second gear wheels to be rotated relative to each other in a reverse direction.

The interlocking members may be received, for example freely, in corresponding recesses having at least one inclined surface or ramp. The ramp may be inclined relative to a tangential line that is perpendicular to a reference line passing through the center of the first and second gear wheels and the point of contact of an interlocking member with the second gear wheel. The slope of the inclined surface or ramp in each recess increases in the direction of rotation of the first gear wheel into the mirror operative condition.

In some cases, the recesses may be formed on an inner surface of the first gear wheel. However, the recesses could be alternatively formed on an inner surface of the second gear wheel. Still in some examples, some recesses could be alternatively formed on an inner surface of the first gear wheel and some recesses could be formed on an inner surface of the second gear wheel. In the latter case, however, the interlocking members should be arranged at different heights so that the interlocking members in different gear wheels do not interfere with each other. In any case, it is preferred that the recesses are radially distributed at equal angular intervals on the inner surface of the at least one of the first and second gear wheels.

However, in preferred examples, the recesses may be formed on a separate piece such as a ring adapted to be fitted into at least one of the first gear wheel and the second gear wheel. This preferred example has been found to be advantageous in terms of costs.

The interlocking members may be in the form of links arranged between the first and second gear wheels in contact therebetween. In this example, the links may be connected with each other through connecting elements. The links are allowed to move between an interlocking position and a non-interlocking position. As the first and second gear wheels are rotated in one direction of rotation, the links themselves are rotated against biasing means a certain angle to a particular angular position such that the first and second gear wheels are allowed to be rotated together in said direction of rotation.

The links can be also rotated in a reverse direction a certain angle to a different angular position such that the first and second gear wheels can be rotated relative to each other in a reverse direction of rotation.

In one example, at least some of the interlocking members may comprise a roller that is fitted within the corresponding recess. The rollers are biased into contact both with the above mentioned inclined surface or ramp of the recess in at least one of the first and second gear wheels and the other of the first and second gear wheels by biasing means. In a first direction of rotation, the rollers roll on the ramps urged by said biasing means locking the first and second gear wheels to each other, thus transmitting torque. This results in that the first gear wheel can be rotated together with the mirror head by the motor component together with the second gear wheel in the reverse direction of rotation into the mirror folded condition (parking position).

In a reverse direction of rotation when the user rotates manually the mirror head into the mirror operative condition for driving, the first gear wheel is allowed to rotate relative to the second gear wheel. Frictional contact of the gear wheels with the roller causes the roller to roll on the inclined surface of the recess against biasing means until a specific accurate mirror operative condition suitable for driving has been reached.

The inclined plane or ramp is preferred to be a flat surface. However, in some cases, the inclined plane or ramp could be curved. Irrespective of whether the inclined planes or ramps are flat or curved surfaces, they are arranged and configured so that the interlocking members are always in contact therewith.

The biasing means may comprise a compression spring provided inside each recess for biasing the rollers against one inner wall of the recess into a position where the interlocking member locks the relative rotational movement of the gear wheels.

The roller clutch of the above preferred example is advantageous since it provides a smooth relative rotation of the gear wheels for arranging the mirror head from the mirror folded condition (parking position) to the mirror operative condition (driving position) when the motor component does not work. In addition to such smooth relative rotation of the gear wheels, noise is significantly reduced in use.

A number of variants of the interlocking members are possible other than rollers. For example, at least some of interlocking members may be balls suitable for rolling on the second gear wheel and on the inclined surface of the recess, or even wedge shaped elements adapted to slide between the inclined surface of the recess and the second gear wheel. Combinations of such variants could be also possible.

In a second example of the first coupling means in the present mirror assembly, the first coupling means may comprise teeth formed in the first gear wheel for coupling teeth formed in the second gear wheel.

The above mentioned configuration defines a tooth clutch. As in the first example, the first coupling means may be adapted for allowing relative rotation of the first gear wheel to the second gear wheel in a first direction of rotation, such that the teeth of the first and second gear wheels slide to each other for arranging the mirror head in the mirror operative condition in case of failure of the motor component, and for allowing the first and second gear wheels to be rotated together in a second, reverse direction of rotation, such that said teeth are meshing with each other, when the first gear wheel is actuated by the motor component.

BRIEF DESCRIPTION OF THE DRAWINGS

Non-limiting examples of the present disclosure will be described in the following, with reference to the appended drawings, in which:

FIGS. 2 and 3 are perspective exploded views from different angles of the rearview mirror assembly in FIG. 1 with the first and second gear wheels separated from each other including a first example of first coupling means;

FIG. 4 is a partial sectional view of the first and second gear wheels where the first example of first coupling means has been detailed;

FIGS. 5 and 6 are perspective exploded views from different angles of the rearview mirror assembly with the first and second gear wheels separated from each other and including a second example of first coupling means;

FIGS. 7a, 7b show the geometric parameters of the teeth in the second gear wheel and the projections in the second gear wheel, respectively;

FIG. 8a is a fragmentary sectional view of the first and second gear wheels in one example where the interlocking members comprise links;

FIG. 8b is a fragmentary sectional enlarged view showing in detail one link and how it is rotated to lock the gear wheels to each other depending on their direction of rotation; and FIG. 9 is an exploded perspective view of one example where the recesses for receiving the interlocking members are formed in a separate piece of the gear wheels.

DETAILED DESCRIPTION OF THE INVENTION

Figure 1:
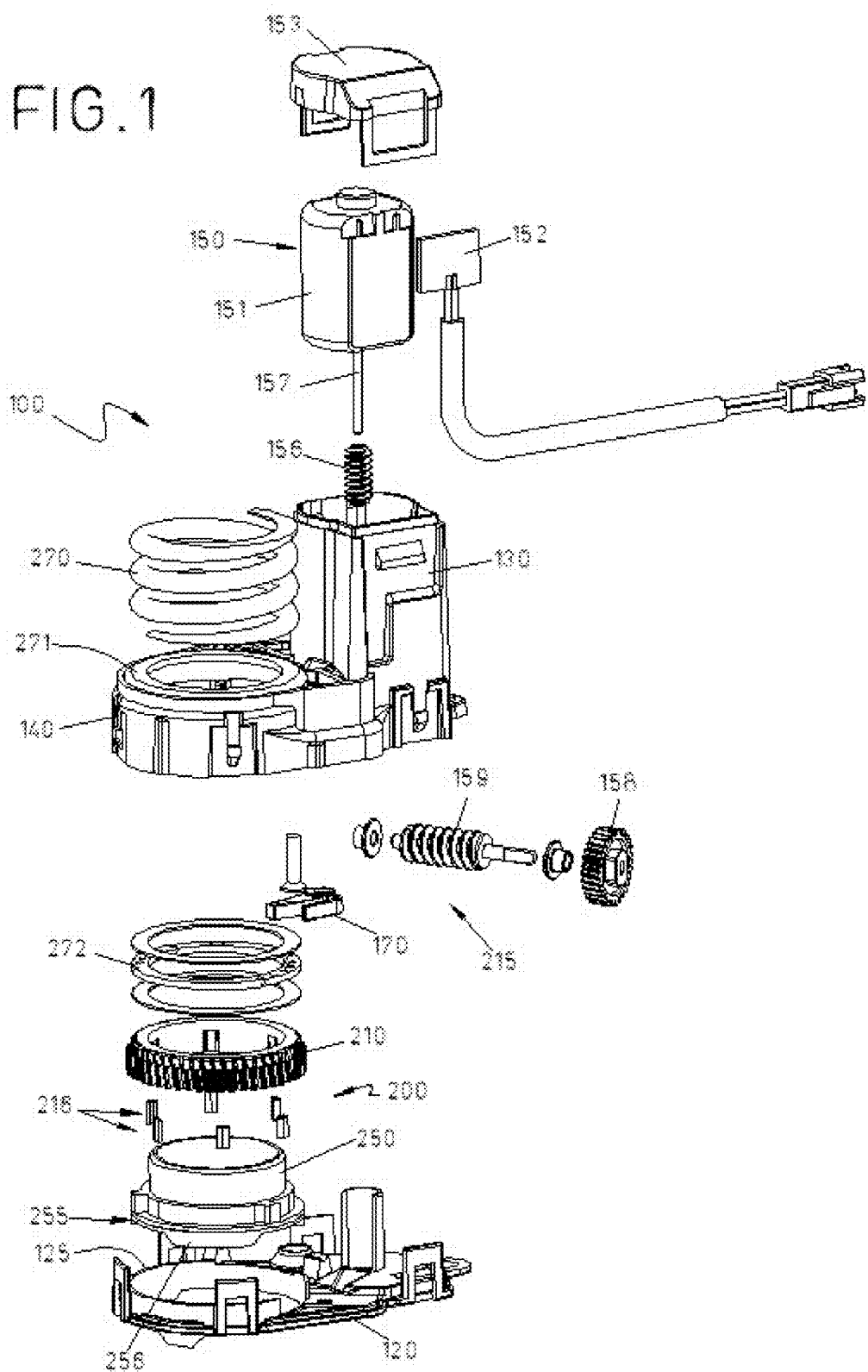
FIG. 1 is a general diagrammatic exploded view of one example of a fold rearview mirror assembly including a first example of first coupling means.

Two non-limiting examples of a fold rearview mirror assembly are described herein with reference to the drawings. In the examples shown in the FIGS. 1-6 the rearview mirror assembly 100 comprises a base member 120 intended for being fixedly mounted on a motor vehicle (not shown).

The base member 120 has recesses 125 formed therein. Recesses 125 are part of a third coupling means 255 or detent mechanism that will be described hereinbelow.

The rearview mirror assembly 100 further comprises a mirror head with a mirror housing adapted for receiving a mirror component (not shown) therein. The mirror head further includes a motor housing 130 adapted for receiving a motor component 150 therein. The motor housing 130 also includes connecting means 152 for connecting the motor component 150 to a control unit (not shown) and to a power supply. The motor housing 130 further includes a top cover 153. The motor housing 130 is attached to the mirror head so that, in use, the motor housing 130 and the mirror head are rotated together.

In the specific example disclosed herein, the motor component 150 comprises an electric motor 151. The electric motor 151 is suitable for rotating the mirror housing together with the motor housing 130, and consequently the mirror head, relative to the base member 120 between a mirror operative condition, that is, with the mirror head unfolded, i.e. in a position suitable for driving, with the mirror head substantially transversal to the direction of travel, and a mirror folded condition, that is, with the mirror head folded, i.e. in a position suitable for when the vehicle is parked, with the mirror head substantially parallel to the direction of travel, and vice versa.

The movement of rotation of the mirror housing together with the motor housing 130 relative to the base member 120 is carried out by means of the electric motor 151 through drive means 215. The drive means will be referred to as second coupling means 215 hereinafter. In the examples shown, the second coupling means 215 comprise a first worm gear 156 that is attached to the motor output shaft 157. The first worm gear 156 engages a drive gear 158 connected to a second worm gear 159 as shown in FIG. 1. The second worm gear 159, in turn, engages outer teeth 211 of a first gear wheel 210. The first gear wheel 210 is part of a gear wheel assembly 200 as it will be explained below. A stopper 170 is also provided. The stopper 170 acts as an end of run stop for the mirror head in the mirror operative condition (driving position).

As stated above, the gear wheel assembly 200 comprises a first gear wheel 210 having outer teeth 211. The gear wheel assembly 200 also comprises a second gear wheel 250. Associated with the gear wheel assembly 200 are first coupling means 216, two examples of which have been shown in detail in FIGS. 2 and 3 of the drawings.

Also associated with the gear wheel assembly 200 are second coupling means 215 and third coupling means 255 which will be explained further below in detail.

The first and second gear wheels 210, 250 are coupled to each other through the above mentioned first coupling means 216 that define a clutch mechanism as it will be explained fully below. The first gear wheel 210, in turn, engages the motor component 150 through the second coupling means 215. More specifically, the outer teeth 211 of the first gear wheel 210 engages the second worm gear 159 of the motor 151, as stated above and shown in FIG. 1. The second gear wheel 250, in turn, engages the base member 120 through the third coupling means 255. As stated above, the third coupling means 255 comprise a number of recesses 125 formed in the base member 120 and corresponding projections 256 formed in the second gear wheel 250. Recesses and projections 125, 256 are part of a detent mechanism for locking the mirror head in specific angular positions.

The first coupling means 216 are adapted for allowing the first and second gear wheels 210, 250 of the wheel assembly 200 to be coupled to each other such that they can be rotated together in a first direction of rotation, and for allowing the first gear wheel 210 to be rotated relative to the second gear wheel 250 in a second, reverse direction of rotation. In the first case when the gear wheel assembly 200 is rotated as a whole in the first direction of rotation, the mirror head is actuated by the motor component 150 through the above mentioned second coupling means 215.

When the mirror head is actuated manually by the user for arranging it in the mirror operative condition (driving position) in case of failure of the motor component 150, the clutch mechanism 210, 250 acts allowing rotation of the first gear wheel 210 relative to the second gear wheel 250 in the reverse second direction of rotation, The advantage of the above arrangement is that, in case of failure of the motor component 150, the mirror head can be rotated manually by the user to an accurate, specific mirror operative condition suitable for driving. The user is also allowed to manually rotate the mirror head to a position other than the driving position. In that case, the first coupling means 216 prevent the mirror head from rotating back into the mirror folded condition, thus assuring that the user may safely drive the motor vehicle even if the mirror head has not been correctly positioned.

FIG. 2 shows a first example of the first coupling means 216 of the mirror assembly 100. In this specific example, the second gear wheel 250 is at least partially fitted within the first gear wheel 210. The first coupling means 216 comprises a number of interlocking members 217. The interlocking members 217 are received in corresponding recesses 212 formed on an inner surface of the first gear wheel 210. The recesses 212 are radially distributed at equal angular intervals on the inner surface of the first gear wheel 210. Any number of recesses 212 may be used although at least three recesses 212 are preferred.

Reference is now made to FIG. 4 of the drawings. Recesses 212 each has one inclined surface or ramp 213 formed therein. As shown in the figure, inclined surface or ramp means herein a surface 213 that is arranged angled relative to a tangential line T perpendicular to a reference line R passing through the center C of the gear wheels 210, 250 and the point of contact of an interlocking member 217 with the second gear wheel 250. The slope of the inclined surface or ramp 213 in each recess 212 increases in the direction of rotation of the first gear wheel 210 into the mirror operative condition, that is counterclockwise in FIG. 4. In the example of FIG. 4, the inclined plane or ramp 213 is a flat surface although it could be curved.

In the particular example shown in FIG. 9, the recess 212 are not formed on an inner surface of the first gear wheel 210 but on an inner surface of a separate piece. In the example shown, the separate piece is a ring 350 adapted to be fitted inside the first gear wheel 210 surrounding the second gear wheel 250.

The interlocking members 217 can be shifted between an interlocking and a non-interlocking position. In the interlocking position, the gear wheel assembly 200 is rotated as a whole in one direction of rotation when the mirror head is actuated by the motor component. In the non-interlocking position, the first and second gear wheels 210, 250 can be rotated relative to each other when the mirror head is actuated manually by the user in a reverse, second direction of rotation for arranging it in the mirror operative condition in case of failure of the motor component 150.

According to the example shown in FIGS. 1-4, the interlocking members comprise a roller 217a that is received within a corresponding recess 125. The rollers 217a are in contact both with the second gear wheel 250 and the above mentioned inclined surface 213 or ramp of the recess 125. Shifting from the interlocking and non-interlocking positions of the rollers 217a is carried out as they are driven when contacted by a peripheral outer surface of the second gear wheel 250. In this example, the rollers 217a are part of a roller clutch for connecting and disconnecting the first and second gear wheels 210, 250 of the gear wheel assembly 200 depending on the direction of rotation of the gear wheel assembly 200.

As the second gear wheel 250 is rotated clockwise as shown in FIG. 4, which corresponds to a manual force exerted by the user on the mirror head and therefore the motor housing 130 and the first gear wheel 210, frictional contact of the roller 217a when contacted by the above mentioned peripheral outer surface of the second gear wheel 250, causes the roller 217a to roll on the second gear wheel 250 as well as on the inclined surface 213 of the recess 212 against biasing means 218. In the example shown, the biasing means comprise a compression spring 218 provided inside each recess 212 of the first gear wheel 210. The compression spring 218 is adapted for biasing the roller 217a against one inner wall of the recess 212 into a position where the relative rotational movement of the gear wheels 210, 250 is locked in one direction of rotation.

As the roller 217a rolls on the inclined surface 213 of the recess 212 of the first gear wheel 210 against the spring 218, the gear wheels 210, 250 can be rotated relative to each other. This allows the mirror head to be arranged from the mirror folded condition to the mirror operative condition for driving in case of failure of the motor component 150, for example. The rollers 217a and ramps 213 define as stated above a roller clutch that allows the user to arrange the mirror head manually in an accurate, specific arrangement since a large number of intermediate angular positions of the mirror head is possible as compared to those provided by the third coupling means 255 due to the configuration of the recesses 125 of base member 120 and the projections 256 of the second gear wheel 250 in the third coupling means 255.

FIGS. 5 and 6 show a second example of the first coupling means 216 of the mirror assembly 100. In this specific example, the first coupling means 216 comprises teeth 220 formed in an inner surface of the first gear wheel 210. The teeth 220 of the first gear wheel are adapted for meshing with corresponding teeth 251 formed in an upper portion of the second gear wheel 250.

FIG. 7a shows the geometric parameters of the teeth 251 in the second gear wheel 250. A first base angle $\alpha$ is defined in the range of 84-90° with 87° being preferred. A second base angle $\beta$ is defined in the range of 15-60° with 30° being preferred. The first and second angles $\alpha$, $\beta$ of the teeth 251 in the second gear wheel 250 are defined respectively by the opposite walls of said teeth 215 relative to an upper end surface 252 of the second gear wheel 250.

FIG. 7b shows the geometric parameters of the projections 256 in the second gear wheel 250. A first base angle $\gamma$ is defined in the range of 30-60° with 45° being preferred. A second base angle $\delta$ is defined in the range of 30-60° with 45° being preferred. The first and second angles $\gamma$, $\delta$ of the projections 256 in the second gear wheel 250 are defined by opposite walls of said projections 256 relative to a lower end surface 253 of the second gear wheel 250.

The teeth 220 of the first gear wheel 210 and the teeth 251 of the second gear wheel 250 define a tooth clutch. The tooth clutch 220, 251 allows the first and second gear wheels 210, 250 of the gear wheel assembly 200 to be rotated together in a first direction when the first gear wheel 210 is actuated by the motor component 150 between a mirror folded position and a mirror operative position and vice versa. In turn, the tooth clutch allows relative rotation of the first gear wheel 210 to the second gear wheel 250 for arranging the mirror head from the mirror folded position to the mirror operative position by acting manually on the mirror head by the user in case of failure of the motor component 150.

In the example shown in FIG. 8a, the first coupling means 216 comprise a number of interlocking members 217 in the form of links 217b. The links 217b are arranged between the first and second gear wheels 210, 250 in contact therebetween. Connecting elements 310 are provided for connecting the links 217b with each other. The links 217b are adapted to move between an interlocking position and a non-interlocking position acting as a clutch. The links 217b can be rotated around an axis 300 against biasing means (not shown). As shown in FIG. 8b, when the links 217b are rotated clockwise the first and second gear wheels 210, 250 are locked to each other due to the distance d1 which is substantially longer than the space between the first and second gear wheels 210, 250. The first and second gear wheels 210, 250 are thus allowed to be rotated together in one direction of rotation. When the links 217b are rotated counter clockwise the first and second gear wheels 210, 250 are released from the contact of the links 217b since the distance d2 is now substantially shorter than the space between the first and second gear wheels 210, 250 such that first and second gear wheels 210, 250 are thus allowed to be rotated can be rotated relative to each other.

In case of failure of the motor component 150, the mirror head can be rotated manually by the user to the mirror operative condition for driving but also to any other intermediate mirror position as required. A large number of intermediate mirror positions are again available into which the mirror head can be arranged if the motor component 150 does not work. Again, this is possible since the size of the teeth 220, 251 involved in the tooth clutch are small and a large number of teeth can be provided as compared to the recesses 125 of base member 120 and the projections 256 of the second gear wheel 250 in the third coupling means 255.

As shown in FIG. 1, a main spring 270 is also provided. The main spring 270 serves the purpose of forcing the motor housing 130, through an extension 140 thereof, against the base member 120. The main spring 270 could be however arranged in different locations as long as the gear wheel assembly 200 is urged against the base member 120. For example, a portion of the mirror head may be located between the extension 140 of the motor housing 130 and the main spring 270 such that the main spring 270 urges the mirror head, and in turn the motor housing 130, against the base member 120.

Sliding tracks 271 are provided associated with the main spring 270 for facilitating relative rotation of the motor housing 130 or the mirror head relative to the base member 120.

As shown in FIG. 1, sliding tracks 272 may be also provided between the first gear wheel 210 and the second gear wheel 250 of the wheel assembly 200 in order to facilitate rotation to each other in use.

As to the third coupling means 255, rotation of the mirror head relative to the base member 120 causes the projections 256 of the second gear wheel 250 to slide relative to the recesses 125 of the base member 120. This results in that the mirror head is displaced vertically relative to the base member 120 from a first height to a second, higher height compressing the above mentioned main spring 270 until the mirror folded condition (parking position) has been reached. Then, the mirror head, together with the motor housing 130, is displaced downwards again relative to the base member 120 from the second height to the first height, releasing the main spring 270. The process for turning the mirror head back to the mirror operative condition (driving position) is the same as disclosed but in the reverse order.

As stated above, in cases for example of failure of the motor component 150, the configuration of the present fold rearview mirror assembly 100 allows the mirror head to be unfolded back manually by the user from the mirror folded condition to the mirror operative condition or any other suitable, intermediate position of the mirror head suitable for driving, for example.

In this case, the first coupling means 216 are actuated and not the third coupling means 255 as the torque required to actuate the first coupling means 216 is less than the torque required to actuate the third coupling means 255 from the parking position to the driving position.

With the present mirror assembly having the above described clutch mechanism based on rollers 217a, links 217b or teeth 220, 251, rotation of the mirror head by the user is allowed without requiring strong force to be exerted in order to compress the main spring 270. The mirror head can be locked effectively in the driving position but also in other intermediate positions if required and left locked therein.

It is to be noted that both in the first example of the first coupling means shown in FIGS. 1-4 and the second example of the first coupling means shown in FIGS. 5-7, the gear wheel assembly 200 is designed such that the mirror head can not be folded manually by the user, that is, it can not be driven manually by the user from the mirror operative condition (driving position) into the mirror folded condition (parking position). This is because a stronger force is required for compressing the main spring 270 in this direction of rotation of the mirror head than in the reverse direction of rotation of the mirror head.

In this situation, the first coupling means 216 are not actuated but the third coupling means 255 are, as the torque required to actuate the first coupling means 216 is greater than the torque required to actuate the third coupling means 255 from the driving position to the parking position.

Although only a number of examples have been disclosed herein, other alternatives, modifications, uses and/or equivalents thereof are possible. Furthermore, all possible combinations of the described examples are also covered. Thus, the scope of the present disclosure should not be limited by particular examples, but should be determined only by a fair reading of the claims that follow.

Reference signs related to drawings and placed in parentheses in a claim, are solely for attempting to increase the intelligibility of the claim, and shall not be construed as limiting the scope of the claim.

The invention claimed is:

1. Fold rearview mirror assembly for a motor vehicle, the fold rearview mirror assembly comprising:
 a base member for being mounted on the motor vehicle,
 a mirror head,
 a motor component intended for rotating, through a gear wheel assembly, the mirror head relative to the base member between a mirror operative condition and a mirror folded condition, and vice versa wherein the gear wheel assembly comprises:
 first and second gear wheels;

a first coupling adapted to releasably engage the first and second gear wheels with each other;
a second coupling adapted to engage the first gear wheel with the motor component; and
a third coupling adapted to engage the second gear wheel with the base member;
wherein the first coupling is adapted for allowing the first and second gear wheels to be rotated together in one direction of rotation, and for allowing the first gear wheel to be rotated relative to the second gear wheel in a reverse direction of rotation.

2. Mirror assembly as claimed in claim 1, wherein the first coupling comprises a plurality of interlocking members each adapted to move between an interlocking position and a non-interlocking position when driven by the contact of each one of the plurality of interlocking members with one of the first gear wheel and the second gear wheel against a biasing means of each one of the plurality of interlocking members causing the first and second gear wheels to be rotated together in one direction and allowing the first and second gear wheels to be rotated relative to each other in a reverse direction.

3. Mirror assembly as claimed in claim 2, wherein each one of the plurality of interlocking members are received in a respective recess defined by at least one inclined surface such that the plurality of interlocking members can be moved between the interlocking and non-interlocking positions.

4. Mirror assembly as claimed in claim 3, wherein the recess is defined by at least one of the first gear wheel and the second gear wheel.

5. Mirror assembly as claimed in claim 3, wherein the recess is defined by a ring to be fitted into at least one of the first gear wheel and the second gear wheel.

6. Mirror assembly as claimed in claim 3, wherein the inclined surface is arranged angled relative to a tangential line (T) perpendicular to a reference line (R) passing through a center point (C) of the first and second gear wheels and a point of contact of an interlocking member of the plurality of interlocking members with the second gear wheel, with the slope of the inclined surface in the recess increasing in a direction of rotation of the mirror head into the mirror operative condition.

7. Mirror assembly as claimed in claim 3, wherein each one of the plurality of interlocking members is one of a roller and a ball adapted to roll between the corresponding recess and the one of the first gear wheel and the second gear wheel and against the biasing means.

8. Mirror assembly as claimed in claim 3, wherein each one of the plurality of interlocking members is a wedge shaped element adapted to slide between the corresponding recess and the one of the first gear wheel and the second gear wheel and against the biasing means.

9. Mirror assembly as claimed in claim 1, wherein the first coupling includes teeth formed in the first gear wheel for coupling teeth formed in the second gear wheel.

10. Mirror assembly as claimed in claim 9, wherein a first base angle ($\alpha$) is defined in the teeth of the second gear wheel in the range of 84-90° and a second base angle ($\beta$) is defined in the range of 15-60°, said base angles ($\alpha$, $\beta$) being defined by opposite walls of said teeth relative to an upper end surface of the second gear wheel.

11. Mirror assembly as claimed in claim 1, wherein the third coupling includes a number of recesses formed in the base member for receipt of corresponding projections formed in the second gear wheel, wherein the projections are in direct contact with the base member.

12. Mirror assembly as claimed in claim 9, wherein a first base angle ($\gamma$) is defined in the projections in the second gear wheel in the range of 30-60° and a second base angle ($\delta$) is defined in the range of 30-60°, said base angles ($\gamma$, $\delta$) being defined by opposite walls of said teeth relative to a lower end surface of the second gear wheel.

13. Mirror assembly as claimed in claim 2, wherein each one of the plurality of interlocking members comprise a link arranged between the first and second gear wheels in contact therebetween such that when the first and second gear wheels are rotated in one direction of rotation, each link is rotated to an angular position such that the first and second gear wheels are allowed to be rotated together in said direction of rotation and when the first and second gear wheels are rotated in a reverse direction of rotation, each link is rotated to an angular position such that the first and second gear wheels are allowed to be rotated relative to each other.

14. Mirror assembly as claimed in claim 1, wherein the first coupling is adapted for allowing relative rotation of the first gear wheel to the second gear wheel in one direction for bringing the mirror from a folded position to an operative position and for allowing the first and second gear wheels to be rotated together in a reverse direction when the first gear wheel is actuated by the motor component.

15. Mirror assembly as claimed in claim 1, wherein the assembly further includes a main spring forcing a motor housing enclosing the motor component against the base member.

16. Mirror assembly as claimed in claim 15, wherein the assembly further includes sliding tracks facilitating relative rotation of the motor housing.

17. Mirror assembly as claimed in claim 16, wherein sliding tracks are provided between one end of the main spring and the motor housing.

18. Mirror assembly as claimed in claim 16, wherein sliding tracks are provided between the first gear wheel and second gear wheel of the gear wheel assembly.

19. A foldable rearview mirror assembly for a vehicle comprising:
a first gear wheel;
a second gear wheel concentrically disposed with respect to the first gear wheel;
a first coupling carried between the first and second gear wheels and adapted to releasably attach the first gear wheel to the second gear wheel;
an electric motor;
a second coupling carried between the electric motor and the first gear wheel, wherein the electric motor is adapted to rotationally drive the second coupling, and the second coupling is adapted to rotationally drive the first and second gear wheels;
a base member adapted for engagement to the vehicle;
a third coupling carried between the second gear wheel and the base member; and
a mirror head adapted to move between a visual operative condition and a folded condition via operation of the electric motor when the first gear wheel is not detached from the second gear wheel via the first coupling.

20. The foldable rearview mirror assembly as claimed in claim 19, wherein the third coupling is releasable.

* * * * *